United States Patent
Stephenson

[11] Patent Number: 6,026,283
[45] Date of Patent: Feb. 15, 2000

[54] ELECTRICALLY CONDUCTIVE KEYPAD LIGHTGUIDES

[75] Inventor: Shawn M. Stephenson, Raleigh, N.C.

[73] Assignee: Ericsson Inc., Research Triangle Park, N.C.

[21] Appl. No.: 08/985,606

[22] Filed: Dec. 5, 1997

[51] Int. Cl.[7] .................................................. H04B 1/08
[52] U.S. Cl. .......................... 455/90; 455/575; 379/433
[58] Field of Search .......................... 455/90, 550, 575; 529/428, 433, 368; 361/26, 814, 816

[56] References Cited

U.S. PATENT DOCUMENTS

| | | | |
|---|---|---|---|
| 5,083,240 | 1/1992 | Pasco | 362/26 |
| 5,335,274 | 8/1994 | Masuda et al. | 379/433 |
| 5,357,065 | 10/1994 | Mitamura et al. | 200/5 |
| 5,371,791 | 12/1994 | Schwartz et al. | 379/433 |
| 5,438,482 | 8/1995 | Nakamura et al. | 361/816 |
| 5,546,457 | 8/1996 | Tomura et al. | 379/368 |
| 5,666,409 | 9/1997 | Tanji et al. | 379/428 |
| 5,717,753 | 2/1998 | Birmanns | 379/419 |
| 5,768,369 | 6/1998 | Zoiss et al. | 379/433 |
| 5,832,371 | 11/1998 | Thornton | 455/90 |
| 5,844,166 | 1/1998 | Halttunen et al. | 361/16 |
| 5,848,152 | 12/1998 | Slipy et al. | 379/433 |

*Primary Examiner*—Wellington Chin
*Assistant Examiner*—Pablo N. Tran
*Attorney, Agent, or Firm*—Myers Bigel Sibley & Sajovec, P.A.

[57] ABSTRACT

A lightguide is provided for illuminating a keypad of a radiotelephone, or other electronic device, via at least one light source located within the electronic device. Conductive pads and conductive traces are provided on a face of the lightguide. Each conductive pad is operably engageable via a respective key of a keypad. The conductive pads and traces are electrically connected with a circuit board within the radiotelephone housing.

26 Claims, 6 Drawing Sheets

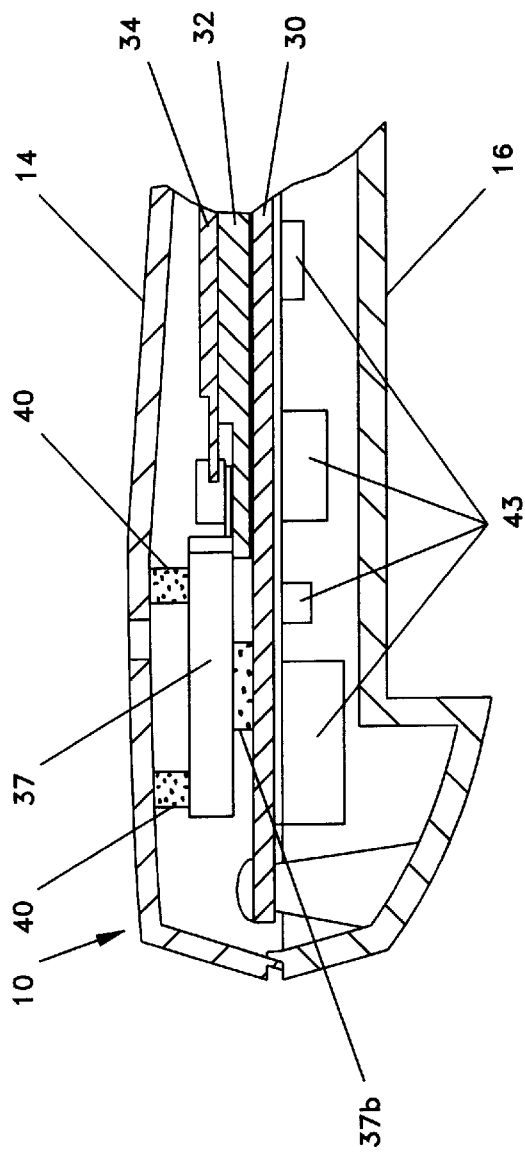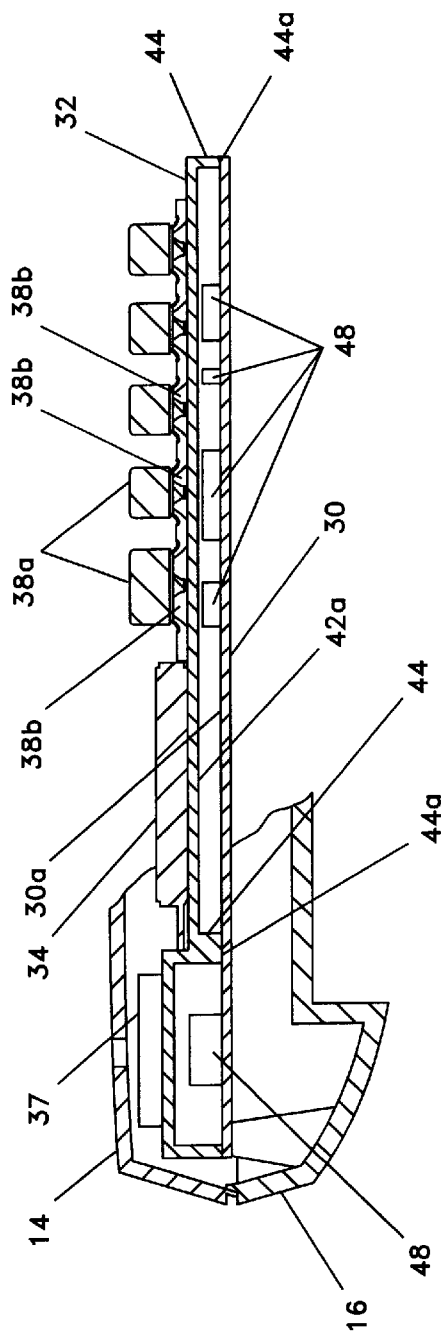

6,026,283

ELECTRICALLY CONDUCTIVE KEYPAD LIGHTGUIDES

FIELD OF THE INVENTION

The present invention relates generally to electronic devices, and more particularly to electronic devices having illuminated keypads, such as radiotelephones.

BACKGROUND OF THE INVENTION

Radiotelephones, such as cellular telephones, have become increasingly popular for both personal and commercial use. Radiotelephones have also become smaller to facilitate storage and portability. Consequently, space or "real estate" on circuit boards hosting electronic components within radiotelephones has become somewhat limited.

A lightguide within a radiotelephone may be utilized to illuminate a keypad of translucent keys via a light source internal to the radiotelephone. A lightguide may also be utilized to support a keypad and a liquid crystal display (LCD) for the radiotelephone. The lightguide may be placed directly on a circuit board hosting electronic components for generating and receiving telecommunications signals. The circuit board beneath a lightguide may include conductive pads, each associated with a respective key of the keypad. Each key typically has an end that extends through the lightguide and is operably engageable with a respective conductive pad. Unfortunately, because of the required spacing between keys, the conductive pads and the conductive traces associated with the conductive pads can occupy much of the circuit board real estate beneath a lightguide. As a result, much of the circuit board space beneath a lightguide may be unusable for hosting electronic components thereon. Furthermore, the placement of through-hole vias may be limited.

SUMMARY OF THE INVENTION

It is therefore an object of the present invention to provide electronic devices, such as radiotelephones, which can include increased circuit board real estate upon which to host electronic components.

It is another object of the present invention to simplify radiotelephone assembly and reduce manufacturing costs.

These and other objects of the present invention are provided by a lightguide configured to illuminate a keypad of a radiotelephone, or other electronic device, via at least one light source located within the electronic device, that includes a plurality of conductive pads and conductive traces on a face thereof. Each conductive pad is operably engageable via a respective key of a keypad. The conductive pads and traces are electrically connected with a circuit board within the radiotelephone housing.

Various components may be mounted on the lightguide and electrically connected to a circuit board within the radiotelephone. For example, speakers LCD panels, and/or microphones may be secured to the lightguide. Components secured to the lightguide make electrical contact with a circuit board within the radiotelephone when the lightguide is assembled within the radiotelephone. Hard-wiring of the components directly to a circuit board may not be required. Additionally, the lightguide may include conductive material added thereto or integral therewith for providing electromagnetic interference (EMI) shielding.

According to other aspects of the present invention the lightguide is secured within a radiotelephone housing in spaced apart relationship with a circuit board to define one or more compartments between the lightguide and the circuit board. One or more wall portions may depend from the lightguide to maintain a spaced-apart relationship between the lightguide and circuit board. These wall portions may be configured to contact the circuit board to thereby define one or more compartments between the circuit board face and the lightguide first face when the lightguide is secured within the housing. For example, a wall portion may depend from the lightguide along peripheral edge portions thereof to define a compartment between the circuit board and the lightguide. Additional wall portions may be utilized to create additional compartments. These compartments provide additional space within which electronic components can be secured to the circuit board. Otherwise unusable circuit board real estate is made available for additional electronic components and vias by maintaining the circuit board and lightguide in a spaced apart relationship.

A keypad may be secured to the lightguide and may comprise a plurality of translucent keys. Each key has a first end extending through the housing to facilitate operation of the radiotelephone by a user. Each key also has a second end extending through the lightguide. The second end of each key is operably engageable with a respective contact pad on the circuit board face.

The present invention is advantageous with respect to radiotelephones because it can optimize circuit board real estate, can reduce the number of components within a radiotelephone, and can simplify radiotelephone assembly. The combination of spacing apart a lightguide and an underlying circuit board and removing the conductive pads and traces from the circuit board can create additional space for other electronic components heretofore unavailable within electronic devices such as radiotelephones.

Furthermore, because additional components, such as speakers and microphones may be mounted on the lightguide, interchangeability of housing top covers may also be facilitated, which can reduce manufacturing costs. By mounting these components in the lightguide, LCD reflective tape and shield cans may no longer be required. Also, by providing conductive material on or within the lightguide, the need for applying conductive material to the housing top cover may also be eliminated.

BRIEF DESCRIPTION OF THE DRAWINGS

FIG. 4 is a cross-sectional view of a radiotelephone with a speaker mounted to a lightguide and incorporating vibration reduction pads, according to aspects of the present invention.

FIG. 6 is a cross-sectional view of a radiotelephone having a lightguide in spaced apart relationship with a circuit board to define a compartment between the lightguide and the circuit board, according aspects of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
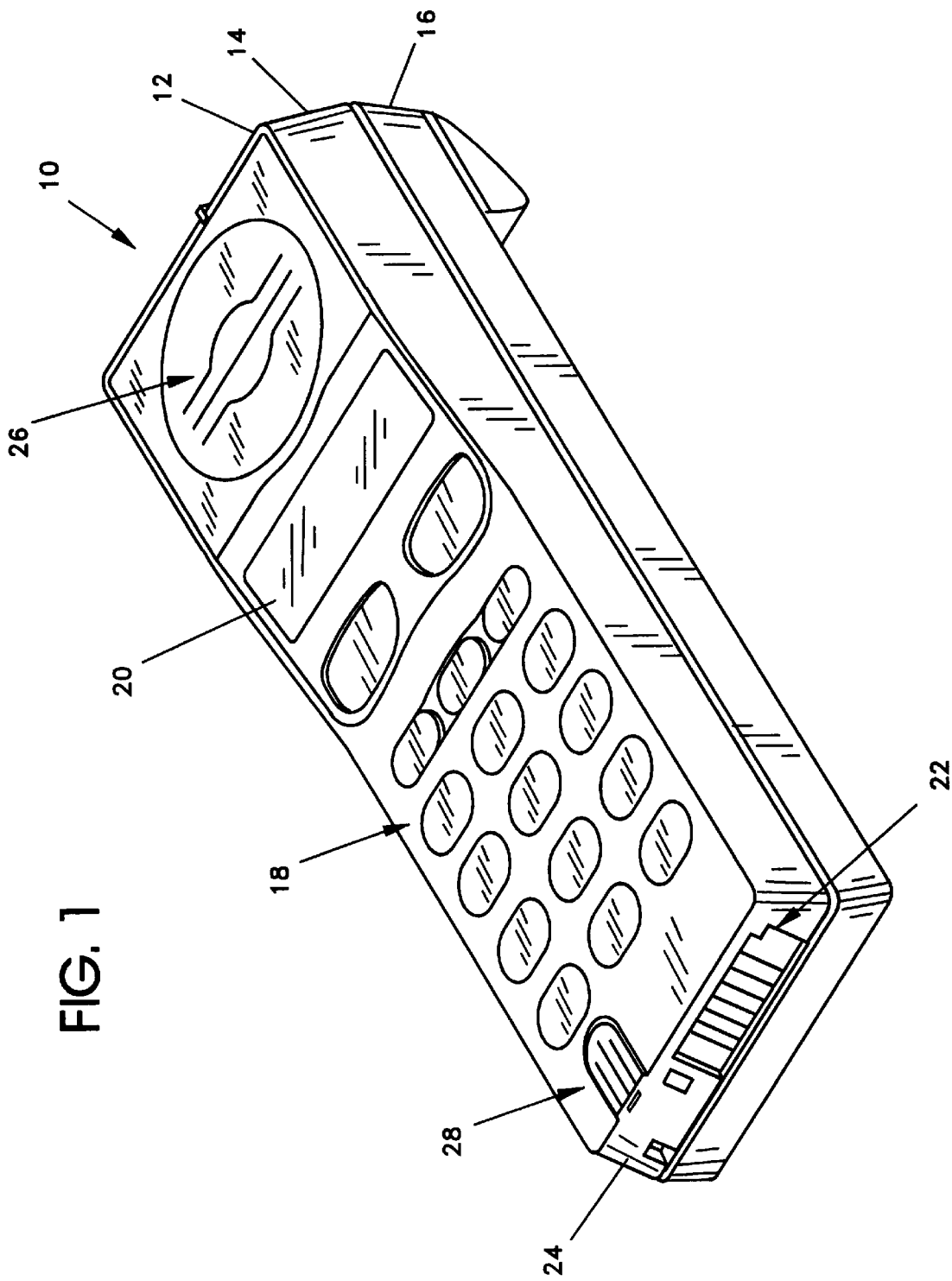
FIG. 1 illustrates an exemplary radiotelephone within which aspects of the present invention may be incorporated.

Referring now to FIG. 1, a conventional radiotelephone 10 includes a housing 12 having a top portion 14 and a bottom portion 16. The top and bottom housing portions 14, 16 enclose electronic components that enable the radiotelephone 10 to transmit and receive telecommunications signals. An antenna (not shown) for receiving telecommunications signals is typically provided, and a keypad 18, and display window 20 facilitate radiotelephone operation. Electrical connectors 22 on a bottom portion 24 of the illustrated radiotelephone housing 12 are configured to connect with electrical connectors within a cradle to facilitate hands-free operation of the radiotelephone, recharging of batteries within the radiotelephone, and the like. Slots 26 are provided at one end of the radiotelephone 10 for allowing a user to hear audio communications via a speaker enclosed within the housing 12. Slots 28 are provided at an opposite end of the radiotelephone 10 for allowing a user to speak into a microphone enclosed within the housing 12.

Figure 2:
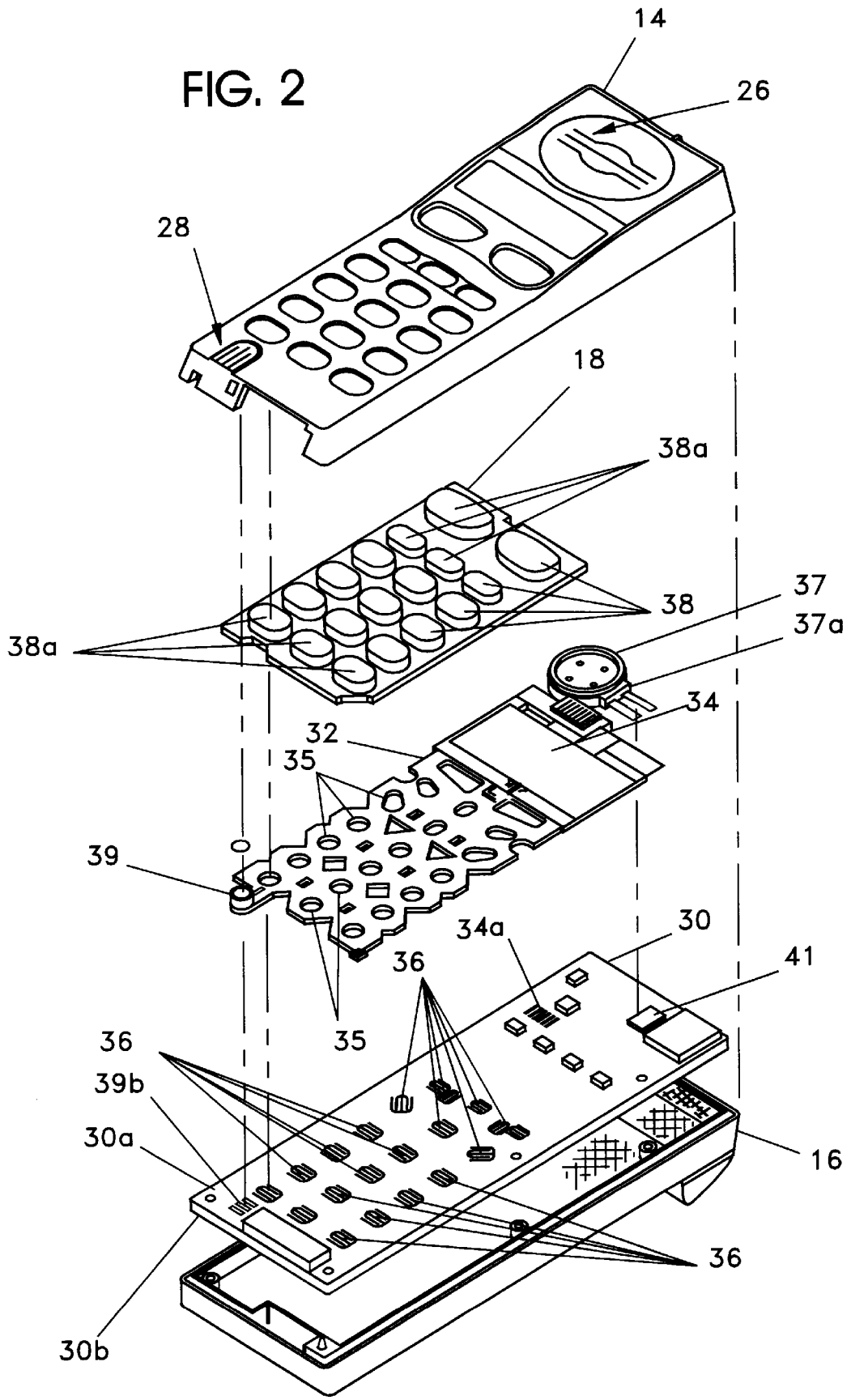
FIG. 2 is an exploded perspective view of a circuit board, lightguide, and keypad according to aspects of the present invention, and configured to be contained within the housing of the radiotelephone illustrated in FIG. 1.
Figure 3:
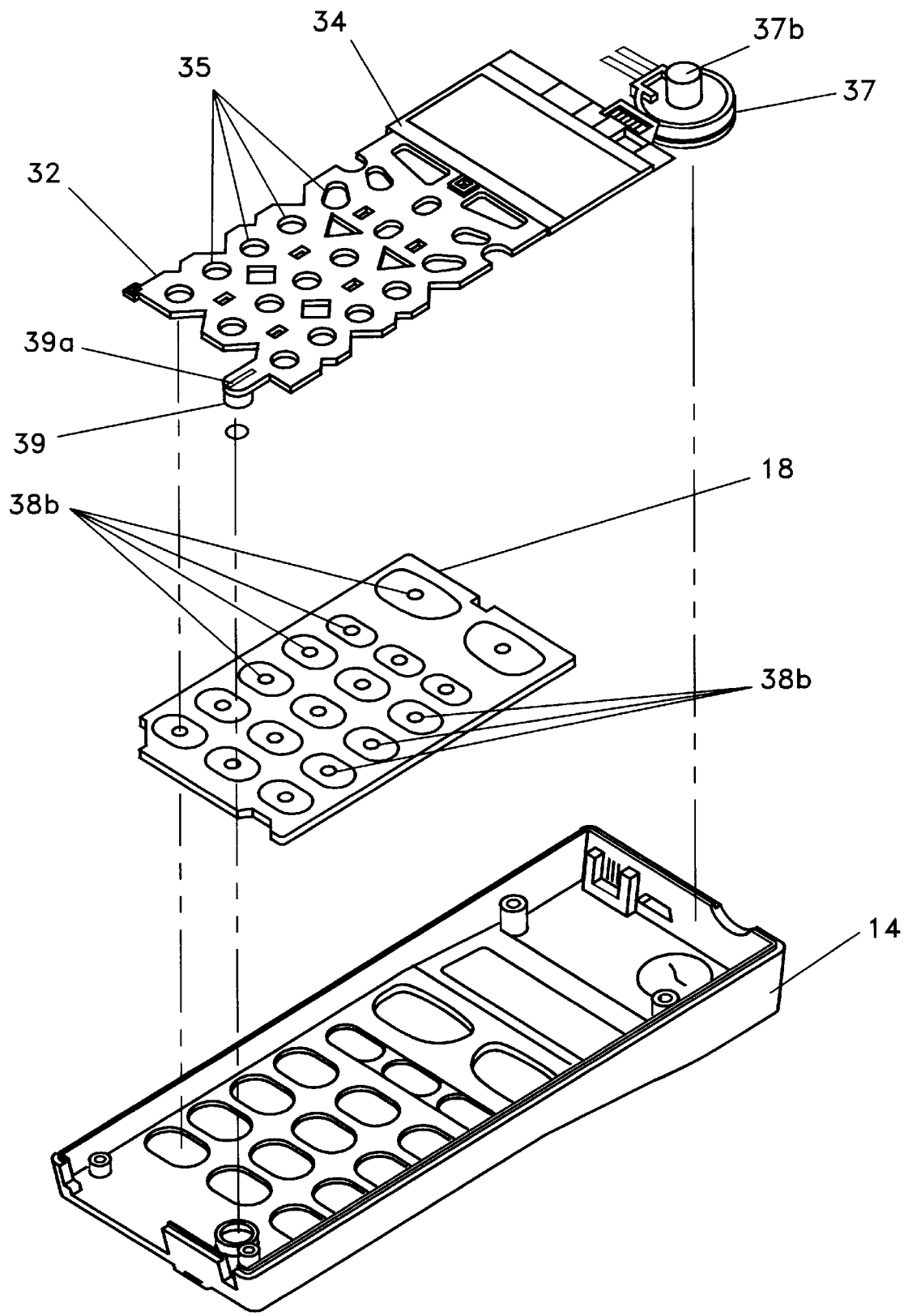
FIG. 3 is an exploded perspective view from below of a lightguide and keypad according to aspects of the present invention, and configured to be contained within the housing of the radiotelephone illustrated in FIG. 1.

Referring now to FIGS. 2–3, an exploded perspective view is provided of internal components contained within the housing 12 of a radiotelephone 10. Illustrated components include a circuit board 30, lightguide 32, and keypad 18. As is known to those skilled in the art, various electronic components that enable the radiotelephone 10 to transmit and receive telecommunications signals are mounted on the circuit board 30. The illustrated circuit board includes opposing first and second faces 30a, 30b. Most electronic components are attached to the circuit board second face 30b because contact pads 36 are located on the circuit board first face 30a and because the lightguide 32 overlies and is in direct contact with the circuit board first face. The contact pads 36 are positioned so that a respective contact pad is positioned beneath a respective key of the overlying keypad 18. As a result, the contact pads 36 utilize a significant amount of surface area of the circuit board first face 30a.

The lightguide 32 is configured to illuminate a keypad having translucent keys by directing light generated by one or more light sources to the underside portion of each key. As is known to those skilled in the art, a lightguide allows point sources of light to be distributed evenly over a surface area. A lightguide provides the necessary key travel distance required for the correct actuation and tactile feel when keypads having detents (i.e., the clicking feeling of keys when pressed) are utilized. A lightguide also holds the LCD and distributes light evenly to back light the LCD. Preferably, one or more light sources (not shown) are mounted to the circuit board first face 30a. As is understood by those skilled in the art, preferred light sources for use in illuminating keypads of electronic devices such as radiotelephones, include light emitting diodes (LEDs), and the like.

Lightguides are typically made from polymeric material including, but not limited to, polycarbonate, acrylic, ABS, and blends. The present invention may be utilized with other back lighting technologies including, but not limited to, electroluminescence. Electroluminescence relates to a thin film, typically less than 0.5 millimeter (mm) thick, that glows when a voltage is applied. In addition, the present invention may be utilized where LEDs are incorporated within each key of a keypad.

The illustrated lightguide 32 includes a plurality of apertures 35 formed therethrough. Each aperture 35 is configured to align with a respective key of the overlying keypad 18, as described below. An LCD 34 is attached to the illustrated lightguide 32 and is viewable through the display window 20 of the top housing portion 14 when the illustrated radiotelephone 10 is assembled. LCD 34 makes electrical contact with the circuit board 30 via electrical contacts 34a, as illustrated. A speaker 37 is also attached to the lightguide 32 as illustrated, and is configured to align approximately with the slots 26 in the top housing portion 14 when the illustrated radiotelephone 10 is assembled. A microphone 39 is also attached to the lightguide 32 as illustrated, and is configured to align approximately with the slots 28 in the top housing portion 14 when the illustrated radiotelephone 10 is assembled.

When the radiotelephone 10 is assembled, the lightguide 32 overlies the circuit board 30 so that an electrical contact 37a on the speaker 37 makes contact with electrical contact 41 on the circuit board to establish electrical communication therebetween. A pad 37b provides a counter force to that exerted on the speaker by contact between the speaker electrical contact 37a and circuit board contact 41. Also, when the radiotelephone 10 is assembled, the lightguide 32 overlies the circuit board 30 so that electrical contact 39a on the microphone 39 makes contact with electrical contact 39b on the circuit board and electrical communication is established therebetween. By attaching the speaker 37 and/or microphone 39 to the lightguide 32, interchangeability of the top housing portion 14 among various radiotelephone models is facilitated. Furthermore, the need for hard-wiring a speaker 37 and/or microphone 39 to the circuit board may be eliminated, thereby simplifying radiotelephone assembly.

Still referring to FIGS. 2–3, the illustrated keypad 18 overlies the lightguide 32 and has a plurality of translucent keys 38 arranged for user operation. Each illustrated key 38 has a first end 38a configured to extend through the top housing portion 14 for user access, and a second end 38b extending through a respective aperture 35 in the lightguide 32. Each key 38 is positioned to be operably engageable with a respective contact pad 36 on the circuit board first face 30a. When a user presses a key 38, the second end 38b of the key extends through a respective aperture 35 in the lightguide 32 and makes contact with a respective contact pad 36.

Referring now to FIG. 4, a cross-sectional view of an assembled radiotelephone 10 is shown illustrating the relationship of the circuit board 30 and lightguide 32 incorporating aspects of the present invention. As illustrated, electrical components 43 are primarily located on the circuit board second face 30b. The lightguide 32 is in direct contact with the circuit board first face 30a. A speaker 37 is mounted to the lightguide 32 and is in electrical contact with the circuit board 30 via contact 37a, as illustrated. Vibration reduction devices 40, such as pads or springs, are preferably provided to protect the speaker against jarring and other impact forces during use. As would be understood by those skilled in the art, various types of devices may be used to reduce vibration and jarring without departing from the spirit and intent of the present invention.

Figure 5:
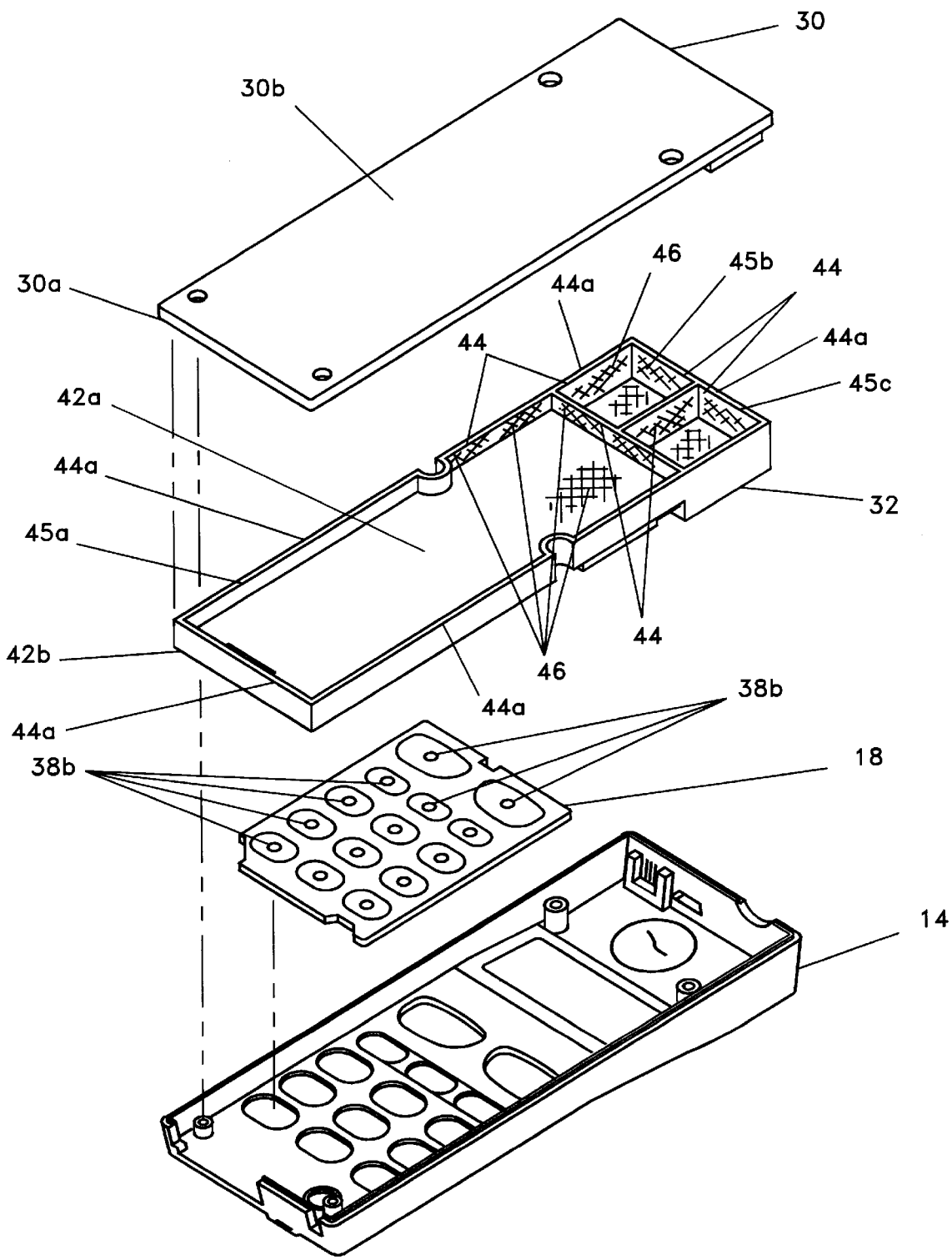
FIG. 5 is an exploded perspective view from below of the internals of a radiotelephone wherein a lightguide is configured with multiple compartments and conductive material for EMI shielding.
Figure 7:
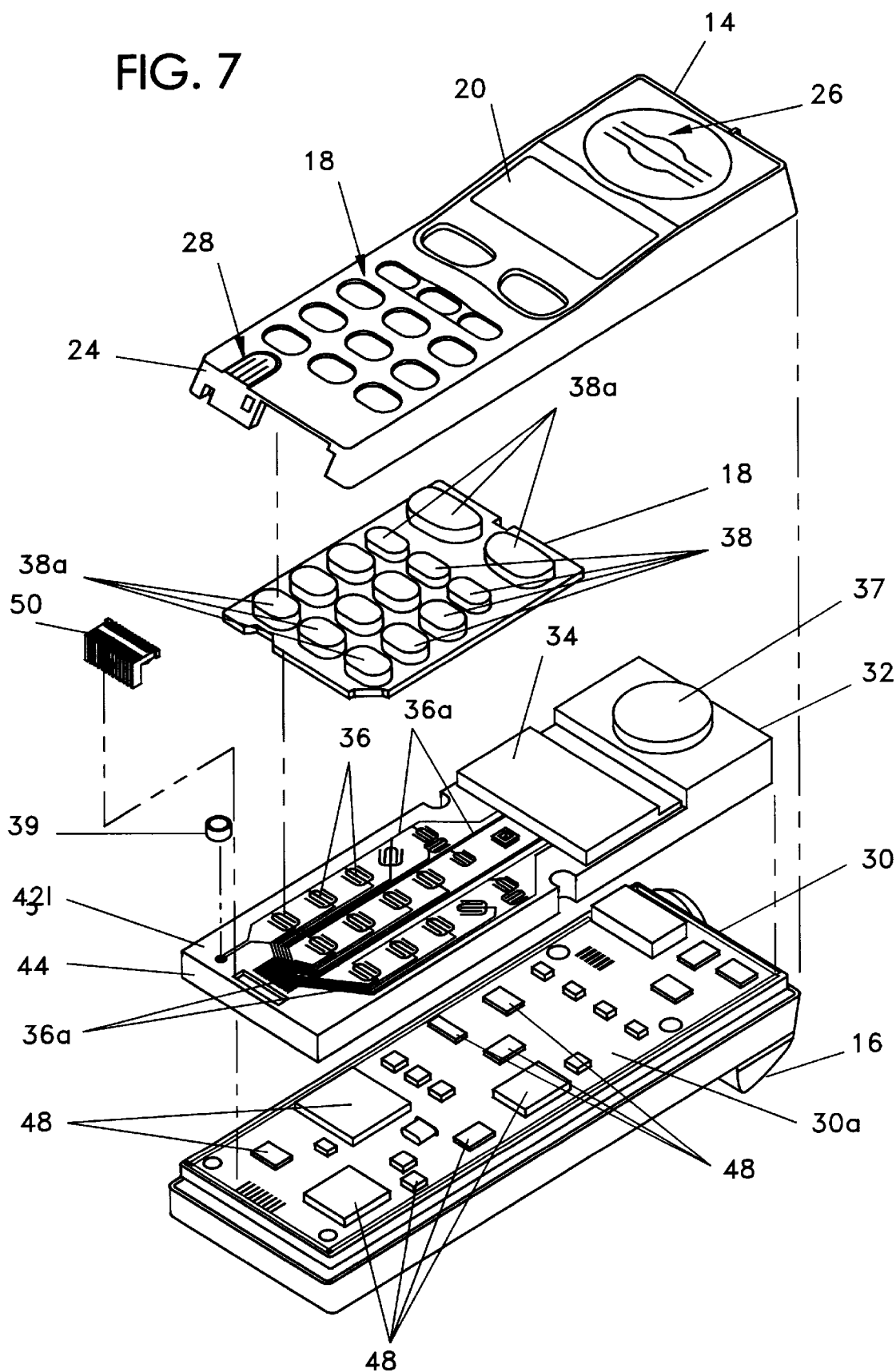
FIG. 7 is an exploded perspective view of the internals of a radiotelephone wherein a lightguide has contact pads integral therewith and operably engageable with an overlying keypad, according to aspects of the present invention.

Referring now to FIGS. 5–7, a lightguide 32 incorporating additional aspects of the present invention is illustrated. The lightguide includes first and second opposing faces 42a, 42b. Walls 44 extend from the first face 42a, as illustrated, to form multiple compartments 45a, 45b, 45c. It is understood, however, that a lightguide incorporating aspects of the present invention is not limited to the illustrated compartment configuration. The walls 44 may be configured in various ways to form one or more compartments. For example, the walls 44 may extend from the lightguide first face 42a along the periphery of the first face to define a single compartment.

As illustrated in FIG. 6, when the lightguide 32 is assembled within a radiotelephone 10, the edge portions 44a of the walls 44 make contact with the circuit board first face 30a such that the compartments 45a, 45b, 45c overlie the circuit board 30 and the lightguide first face 42a is maintained in a spaced-apart adjacent relationship with the circuit board first face 30a. The walls 44 preferably have a height sufficient to allow various electronic components 48 to be secured to the circuit board first face 30a beneath the lightguide. By providing one or more compartments between the circuit board 30 and the overlying lightguide 32, according to the present invention, available circuit board surface area is increased. It is understood that the present invention is not limited to the illustrated spaced apart configuration of the lightguide 32 and the circuit board 30. Other ways of maintaining the lightguide 32 and the circuit board 30 in spaced apart relationship may be utilized.

Preferably, the walls 44 and wall edge portions 44a include conductive material 46 for providing EMI shielding of the electronic components mounted to the circuit board first face 30a within the various compartments 45a, 45b, 45c. In the illustrated embodiment, the conductive material is applied to either the outer and/or inner surface of the walls 44 (FIG. 5). Various techniques are known for applying conductive material to the surface of non-conductive materials, including vacuum metallization, conductive paints, electro and/or electroless plating. However, other types of conductive plating may be used to provide EMI shielding. As is known to those skilled in the art, conductive material may be integral with the material of the walls 44. By providing conductive material on or within the walls 44 extending from the lightguide 32, the need for applying conductive material to the housing top cover may be eliminated.

Referring now to FIG. 7, another aspect of the present invention is illustrated. Additional circuit board real estate may be recovered by moving the contact pads 36 and associated traces 36a from the circuit board first face 30a to the lightguide 32. The contact pads 36 and associated traces 36a may be incorporated as an integral part of the lightguide 32, or as a flexible film overlying the lightguide. According to another aspect of the present invention, the contact pads 36 and associated traces 36a may be incorporated into the keypad 18.

In the illustrated embodiment, the keypad 18 overlies the lightguide 32 such that each key first end 38a is configured to extend through the top housing portion 14. Each key second end 38b is positioned to be operably engageable with a respective contact pad 36 on the lightguide 32. When a user presses a key 38, the second end 38b of the key makes contact with a respective contact pad 36. In the illustrated embodiment, the contact pads 36 and associated traces 36a are electrically connected with the circuit board 30 via a connector 50. In essence, the light guide 32 serves as a child circuit board of circuit board 30.

By removing the contact pads 36 and associated traces 36a from the circuit board first face 30a, additional electronic components 48 can be mounted to the circuit board first face 30a, in the area formerly occupied by the contact pads 36, as illustrated. Additionally, more surface area is available for vias and other signal traces. By maintaining the lightguide 32 and circuit board first face 30a in spaced apart relationship and by removing the contact pads 36 and associated traces 36a from the circuit board first face 30a, circuit board real estate is greatly increased.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An electronic device comprising:
   a housing configured to enclose electronic components;
   a circuit board;
   a keypad having a plurality of translucent keys;
   a lightguide overlying said circuit board within said housing and configured to illuminate said plurality of translucent keys keypad via at least one light source, wherein said lightguide comprises:
   opposing first and second faces; and
   a plurality of walls extending normal from said lightguide first face, wherein each wall has an edge portion configured to make contact with said circuit board such that said lightguide first face is maintained in spaced apart relationship with said circuit board and such that at least one enclosed compartment is defined between said lightguide, said lightguide walls and said circuit board;
   wherein said keypad is secured to said lightguide second face, and wherein said lightguide second face comprises a plurality of conductive pads and conductive traces thereon, and
   wherein each of the plurality of translucent keys has a first end extending through said housing and a second end operably engageable with a respective conductive pad on said lightguide second face; and
   connection means for electrically connecting said conductive pads and traces with said circuit board.

2. An electronic device according to claim 1 wherein said lightguide first face comprises a periphery and wherein said plurality of walls extend from said lightguide first face along said periphery.

3. An electronic device according to claim 2 wherein at least one electronic component is secured to said circuit board within said at least one compartment.

4. An electronic device according to claim 1 further comprising a speaker secured to said lightguide.

5. An electronic device according to claim 1 further comprising vibration reduction means positioned between said speaker and said housing for reducing speaker vibrations.

6. An electronic device according to claim 1 further comprising a microphone secured to said lightguide.

7. An electronic device according to claim 1 further comprising an LCD panel secured to said lightguide.

8. An electronic device according to claim 1 wherein said lightguide comprises conductive material that provides EMI shielding.

9. An electronic device according to claim 1 wherein said electronic device is a radiotelephone.

10. A radiotelephone apparatus comprising:
- a housing configured to enclose electronic components for receiving and transmitting telecommunications signals;
- a circuit board;
- a keypad having a plurality of translucent keys and a plurality of integral conductive pads;
- a lightguide overlying said circuit board within said housing and configured to illuminate said plurality of translucent keys of said keypad via at least one light source, wherein said lightguide comprises:
  - opposing first and second faces; and
  - a plurality of walls extending normal from said lightguide first face, wherein each wall has an edge portion configured to make contact with said circuit board such that said lightguide first face is maintained in spaced apart relationship with said circuit board and such that at least one compartment is defined between said lightguide and said circuit board;
- wherein said keypad is secured to a face of said lightguide and wherein each key has a first end extending through said housing and a second end operably engageable with a respective conductive pad integral with said keypad; and
- connection means for electrically connecting said conductive pads with said circuit board.

11. A radiotelephone apparatus according to claim 10 wherein said lightguide first face comprises a periphery and wherein said plurality of walls extend from said lightguide first face along said periphery.

12. A radiotelephone apparatus according to claim 11 wherein at least one electronic component is secured to said circuit board within said at least one compartment.

13. A radiotelephone apparatus according to claim 10 further comprising a speaker secured to said lightguide.

14. A radiotelephone apparatus according to claim 10 further comprising vibration reduction means positioned between said speaker and said housing for reducing speaker vibrations.

15. A radiotelephone apparatus according to claim 10 further comprising a microphone secured to said lightguide.

16. A radiotelephone apparatus according to claim 10 further comprising an LCD panel secured to said lightguide.

17. A radiotelephone apparatus according to claim 10 wherein said lightguide comprises conductive material for providing EMI shielding.

18. A lightguide configured to illuminate a plurality of translucent keys of a keypad of an electronic device via at least one light source located within said electronic device, said lightguide comprising:
- opposing first and second faces;
- a plurality of walls extending from said lightguide first face, wherein each wall has an edge portion configured to make contact with a circuit board when said lightguide is secured within said electronic device such that said lightguide first face is maintained in spaced apart relationship with said circuit board and such that at least one enclosed compartment is defined between said lightguide, said lightguide walls and said circuit board; and
- a plurality of conductive pads and conductive traces on said lightguide second face, wherein each conductive pad is operably engageable by a respective key of said keypad.

19. A lightguide according to claim 18 further comprising connection means for electrically connecting said conductive pads and traces with a circuit board within said electronic device housing.

20. A lightguide according to claim 18 further comprising a speaker secured to said lightguide.

21. A lightguide according to claim 18 further comprising vibration reduction means for reducing speaker vibrations.

22. A lightguide according to claim 18 further comprising a microphone secured to said lightguide.

23. A lightguide according to claim 18 further comprising an LCD panel secured to said lightguide.

24. A lightguide according to claim 18 further comprising conductive material that provides EMI shielding.

25. A lightguide according to claim 18 wherein said lightguide first face comprises a periphery and wherein said plurality of walls extend from said lightguide first face along said periphery.

26. A lightguide according to claim 18 wherein said electronic device is a radiotelephone.

* * * * *